United States Patent
French et al.

(10) Patent No.: US 7,849,350 B2
(45) Date of Patent: Dec. 7, 2010

(54) RESPONDING TO A STORAGE PROCESSOR FAILURE WITH CONTINUED WRITE CACHING

(75) Inventors: David French, Grafton, MA (US); Douglas Sullivan, Hopkinton, MA (US); H. Austin Spang, IV, Hopkinton, MA (US); Bill Buckley, Brighton, MA (US); Matt Yellen, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 1103 days.

(21) Appl. No.: 11/529,124

(22) Filed: Sep. 28, 2006

(65) Prior Publication Data

US 2008/0155307 A1    Jun. 26, 2008

(51) Int. Cl.
*G06F 11/00* (2006.01)
(52) U.S. Cl. .......................................................... 714/3
(58) Field of Classification Search ...................... 714/2, 714/3, 10–13, 15, 16, 27, 31, 48
See application file for complete search history.

(56) References Cited

U.S. PATENT DOCUMENTS

| | | | |
|---|---|---|---|
| 6,490,659 B1 * | 12/2002 | McKean et al. | 711/141 |
| 6,574,709 B1 * | 6/2003 | Skazinski et al. | 711/119 |
| 6,601,181 B1 | 7/2003 | Thomas | |
| 6,859,890 B2 * | 2/2005 | Humlicek et al. | 714/9 |
| 7,003,620 B2 | 2/2006 | Avraham et al. | |
| 7,120,559 B1 | 10/2006 | Williams et al. | |
| 7,159,022 B2 | 1/2007 | Primm et al. | |
| 7,293,196 B2 * | 11/2007 | Hicken et al. | 714/11 |
| 7,328,324 B2 * | 2/2008 | Wang et al. | 711/173 |
| 7,441,081 B2 * | 10/2008 | Humlicek | 711/113 |
| 2003/0065841 A1 | 4/2003 | Pecone | |
| 2003/0212864 A1 * | 11/2003 | Hicken et al. | 711/122 |
| 2007/0088975 A1 * | 4/2007 | Ashmore et al. | 714/6 |

FOREIGN PATENT DOCUMENTS

| | | |
|---|---|---|
| EP | 0817054 A2 | 1/1998 |
| EP | 0889409 A1 | 1/1999 |

* cited by examiner

*Primary Examiner*—Nadeem Iqbal
(74) *Attorney, Agent, or Firm*—BainwoodHuang

(57) ABSTRACT

A technique responds to a storage processor failure. The technique involves performing write-back caching operations using a cache of a first storage processor, and mirroring data from the cache of the first storage processor to a cache of a second storage processor. The technique further involves, after a failure of the second storage processor in which the second storage processor becomes unavailable, continuing to perform write-back caching operations using the cache of the first storage processor while the second storage processor remains unavailable. A cache controller is capable of being modified so that any write data in the cache of the first storage processor persists if the first storage processor encounters a failure thus preventing loss of the cached write data.

11 Claims, 4 Drawing Sheets

RESPONDING TO A STORAGE PROCESSOR FAILURE WITH CONTINUED WRITE CACHING

BACKGROUND

One conventional data storage system includes two storage processors and an array of disk drives. Each storage processor includes, among other things, a local write cache. The local write caches mirror each other.

During operation, the storage processors perform read and write operations on behalf of one or more external host computers (or simply external hosts). Since the contents of the local write caches are mirrored, the storage processors initially attend to write operations in a write-back manner. That is, the write policy employed by the storage processors involves acknowledging host write operations once the write data is stored in both write caches. By the time the external hosts receive such acknowledgement, the storage processors may not have yet evicted the write data from the write caches to the array of disk drives.

If one of the storage processors fails during operation of the data storage system (e.g., a hardware failure, a software failure, a loss of power to one of the storage processors, etc.), the remaining storage processor vaults the contents of the its local write cache to one or more magnetic disk drives, and then disables its local write cache. The remaining storage processor then flushes the vaulted write cache contents (which are now stored on the magnetic disk drive) to the array of disk drives, i.e., the remaining storage processor empties the vaulted write cache contents by storing the vaulted write data to the array of disk drives.

It should be understood that the remaining storage processor is capable of performing host read and write operations while the remaining storage processor flushes the vaulted write data contents and after such flushing is complete. For example, the remaining storage processor now carries out write operations in a write-through manner where the remaining storage processor stores new write data from an external host to the array of disk drives before acknowledging that the write operation is complete.

It should be further understood that the remaining storage processor vaults the contents of its write cache to the magnetic disk drive and disables its write cache so that a second failure will not result in loss of the cached write data. For example, suppose that the remaining storage processor subsequently encounters a software failure after vaulting the write cache to the magnetic disk drive. When the remaining storage processor recovers from the software failure (i.e., performs a soft reset), the remaining storage processor overwrites its local write cache. In particular, Basic Input/Output System (BIOS) firmware directs the remaining storage processor to clear and test its local write cache. Additionally, the remaining storage processor uses at least a portion of its local write cache for temporarily holding Power-On Self Test (POST) code for running a Power-On Self Test. Although the contents of the local write cache have been overwritten, no write data is lost since the previously-cached write data was immediately vaulted to the magnetic disk drive and since all subsequently received write data is processed in a write-through manner.

SUMMARY

Unfortunately, there are deficiencies in the above-described conventional vaulting scheme which involves transitioning from a write-caching mode when two storage processors are available to a write-through mode when one of the storage processors fails but the other storage processor remains. For example, the remaining storage processor requires time to vault contents of its local write cache to a magnetic disk drive. During this time, the remaining storage processor and thus the data storage system as a whole is unavailable to attend to further write or read operations from external hosts. Accordingly, a write or read operation submitted by an external host during this write cache vaulting event will unfortunately time out.

Additionally, the process of flushing the vaulted write cache contents from the magnetic disk drive to the array of disk drives may take a considerable amount of time (e.g., several hours). During this time, there is a significant time latency associated with processing a new write operation. In particular, if the remaining storage processor receives new write data from an external host computer, the remaining storage processor first accesses the vaulted write cache contents from the magnetic disk drive to see if the new write operation pertains to any vaulted write data from an earlier write operation in order to maintain data integrity. If such vaulted write data exists and if the vaulted write data must be preserved in the event that the new write is aborted, the remaining storage processor completes the earlier write operation, i.e., writes the vaulted write data to the array of disk drives. Then, the remaining storage processor processes the new write operation in a write-through manner.

Furthermore, after the remaining storage processor has finished flushing the vaulted write cache contents from the magnetic disk drive (or alternatively from a mini array of drives holding the vault) to the array of disk drives, the remaining storage processor continues to operate in write-though mode thus passing on a relatively large performance hit onto the external hosts. That is, the remaining storage processor stores write data onto the array of disk drives prior to acknowledging completion of write operations. Such operation results in significant latency compared to response times for processing write data in write-back mode.

Moreover, there may be instances where the failed storage processor encounters only a minor failure (e.g., a software anomaly resulting in a soft reset). In such a situation, the failed storage processor is able to quickly recover from the failure, e.g., a couple of minutes to reboot and perform self-tests. Nevertheless, to prevent the recovered storage processor from interfering with the vault flushing process, the recovered storage processor cannot rejoin the data storage system until the remaining storage processor has completed flushing the vaulted write cache contents to the array of disk drives. Accordingly, the recovered storage processor must remain sidelined during the vault flushing process which may take several hours to complete.

In contrast to the above-described conventional vaulting scheme which involves transitioning from a write-caching mode when two storage processors are available to a write-through mode when one of the storage processors fails but the other storage processor remains, an enhanced technique for responding to a storage processor failure involves continuing to perform write-back caching operations while the failed storage processor remains unavailable. Such a technique alleviates the need for the remaining storage processor to vault cached write data to a magnetic disk and then flush the vaulted write data in response to the failed storage processor. Furthermore, such a technique provides better response time on new host write operations than write-through caching which is performed following the failure in the above-described conventional vaulting scheme.

One embodiment is directed to a method for responding to a storage processor failure. The method includes performing write-back caching operations using a cache of a first storage processor, and mirroring data from the cache of the first storage processor to a cache of a second storage processor. The method further includes, after of a failure of the second storage processor in which the second storage processor becomes unavailable, continuing to perform write-back caching operations using the cache of the first storage processor while the second storage processor remains unavailable. A cache controller is capable of being modified so that any write data in the cache of the first storage processor persists if the first storage processor encounters most failures thus preventing loss of the cached write data.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An enhanced technique for responding to a storage processor failure involves continuing to perform write-back caching operations while the failed storage processor remains unavailable. Such a technique alleviates the need for the remaining storage processor to vault cached write data to one or more magnetic disks and then flush the vaulted write data in response to the failed storage processor as in conventional vaulting schemes which require that the data storage system remain unavailable during the vaulting process and which prevent the failed storage processor from returning during the vault flushing process. Furthermore, such a technique provides better response time on new host write operations than write-through caching which is performed following a failure in the conventional vaulting schemes.

Figure 1:
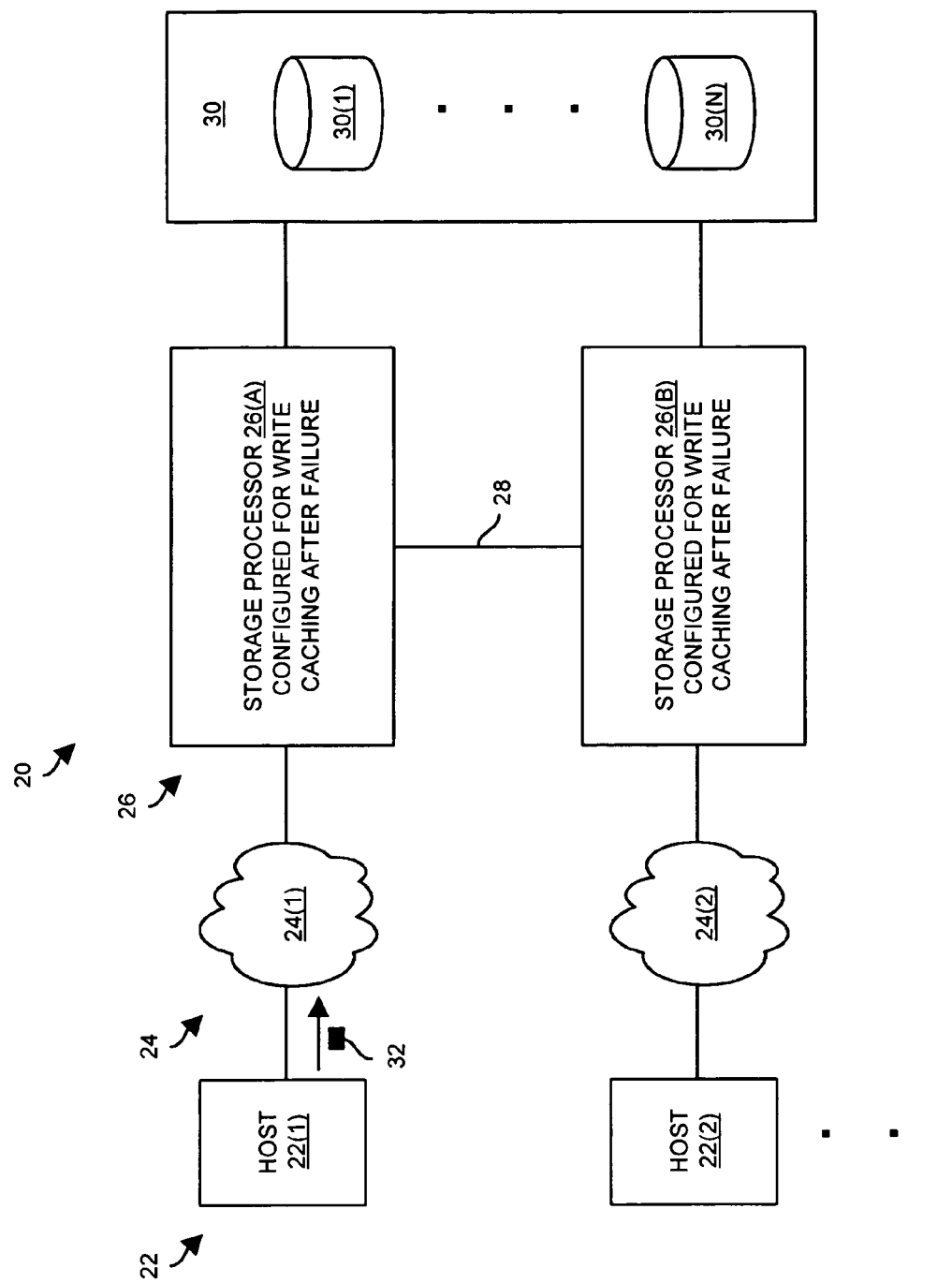
FIG. 1 is a block diagram of a data storage system which is configured to continue write caching after a storage processor failure.

FIG. 1 is a block diagram of a data storage system 20 which is configured to continue write caching on behalf of a set of external host computers 22(1), 22(2), . . . (collectively, external hosts 22) after a storage processor failure. The external hosts 22 connect to the data storage system 20 via a respective communications medium 24(1), 24(2), . . . (collectively, communications media 24).

The data storage system 20 includes multiple storage processors 26(A), 26(B) (collectively, storage processors 26), a cache mirror bus 28 and a set of disk drives 30(1), . . . 30(N) (collectively, disk drives 30). The storage processors 26 are configured to perform data storage operations (e.g., read operations, write operations, etc.) on behalf of the external hosts 22. The cache mirror bus 28 is configured to convey data between caches of the storage processors 26 thus enabling cache mirroring between the storage processors 26. The set of disk drives 30 enables the data storage system 20 to store and retrieve data on behalf of the external hosts 22 in a fault tolerant, non-volatile manner (e.g., using a RAID scheme).

Each storage processor 26 is configured to perform write-back caching in response to write operations 32 from the external hosts 22 while both storage processors 26 are in operation. That is, each storage processor 26 acknowledges completion of a write operation 32 once the write data reaches its local write cache and, if possible, once the write data is mirrored in the local write cache of the other storage processor 26. Additionally, each storage processor 26 is configured to continue to perform such write-back caching after a failure of the other storage processor 26. Such operation enables the data storage system 20 to provide improved response times and quicker recovery in the event a storage processor failure.

For example, suppose that the storage processor 26(A) fails for a short period of time (e.g., due to an unanticipated soft reset). The storage processor 26(B) continues to operating under a write-back write policy. Such continued write-back operation alleviates the need to vault the write cache of the storage processor 26(B) which would otherwise make the data storage system 20 unavailable for a period of time. Additionally, such continued write-back operation avoids the performance hit associated with subsequently flushing the vaulted write cache contents to magnetic disk as well as running the data storage system in a write-through mode. Moreover, since the storage processor 26(B) continues in write-back mode, the storage processor 26(A) is capable of easily becoming active again (i.e., rejoining in performance of host-based read and write operations) rather than having to wait until vault flushing is complete which could take several hours. Further details will now be provided with reference to FIG. 2.

Figure 2:
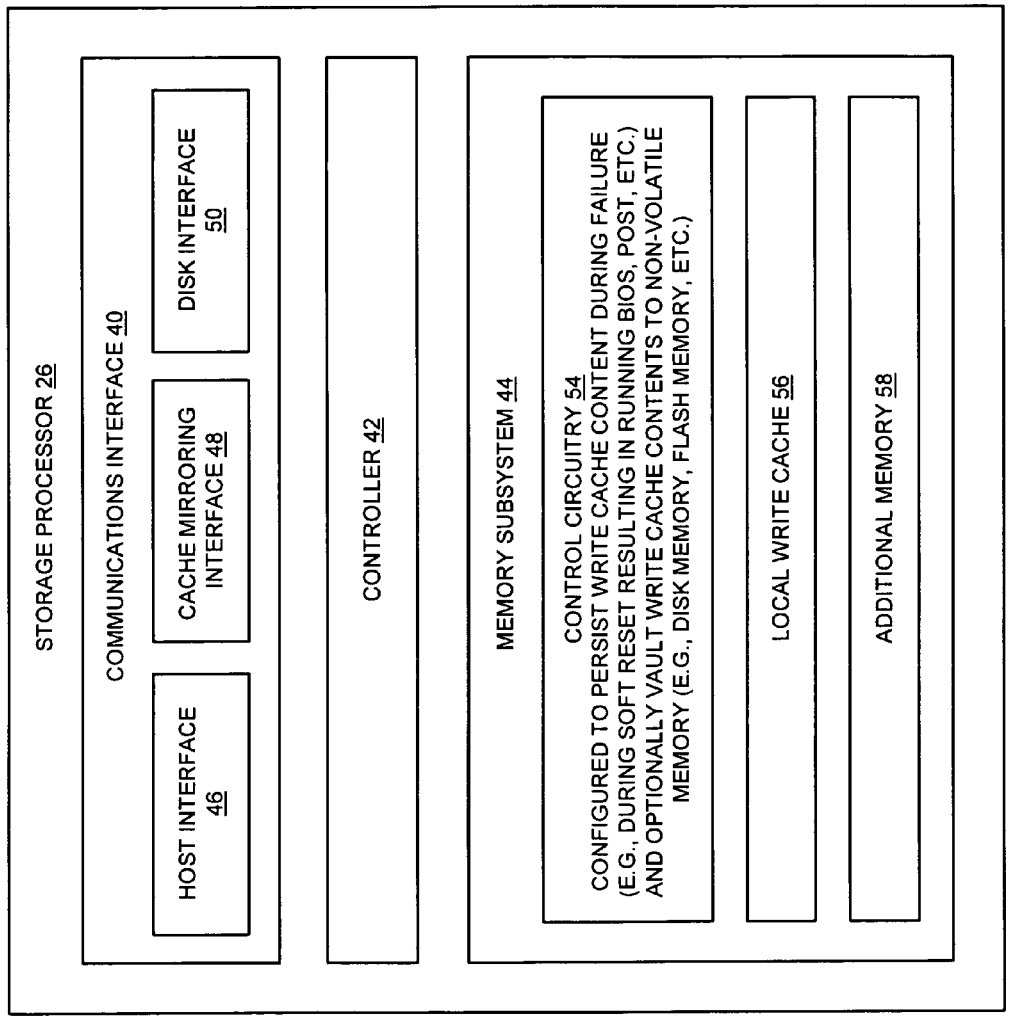
FIG. 2 is a block diagram of a storage processor of the data storage system of FIG. 1.

FIG. 2 is a block diagram of each storage processor 26 of the data storage system 20. Each storage processor 26 includes a communications interface 40, a controller 42 and a memory subsystem 44. The communications interface 40 includes a host interface 46, a cache mirroring interface 48, and a disk interface 50. The memory subsystem 44 includes a control circuit 52, a local write cache 54 and additional memory 58. The additional memory 58 includes operating system storage, firmware for storing BIOS and POST code, optional flash memory, etc.

The communications interface 40 is configured to provide connectivity from the storage processor 26 to various other components. In particular, the host interface 46 is configured to connect the storage processor 26 to one or more external hosts 22 through the connection media 24 (also see FIG. 1). The cache mirroring interface 48 is configured to connect the storage processor 26 (e.g., the storage processor 26(A)) to another storage processor 26 (e.g., the storage processor 26(B)) to enable cache mirroring through the cache mirroring bus 28. The disk interface 50 is configured to connect the storage processor 26 to the set of disk drives 30.

The controller 42 is configured to carryout data storage operations on behalf of one or more of the external hosts 22 through the communications interface 40 (e.g., see the write operations 32 in FIG. 1). In some arrangements, the controller 42 is implemented as a set of processors running an operating system which is capable of being stored in a designated area on one or more of the disk drives 30. In other arrangements, the controller 42 is implemented as logic circuitry (e.g., Application Specific Integrated Circuitry, Field Programmable Gate Arrays, etc.), microprocessors or processor chip sets, analog circuitry, various combinations thereof, and so on.

The memory subsystem 44 is configured to provide memory services to the controller 42. In particular, the control circuitry 54 of the memory subsystem 54 is configured to provide persistent write caching using the write cache 56, i.e., enable the storage processor 26 to continue write caching even after a storage processor failure. The control circuit 54 is further capable of performing other tasks using the additional memory 58 (e.g., operating a read cache, operating as an instruction cache, optionally vaulting contents of the write cache 56 into non-volatile flash memory or disk drive memory in response to a failure of the controller 42, etc.). Further details will now be provided with reference to FIG. 3.

Figure 3:
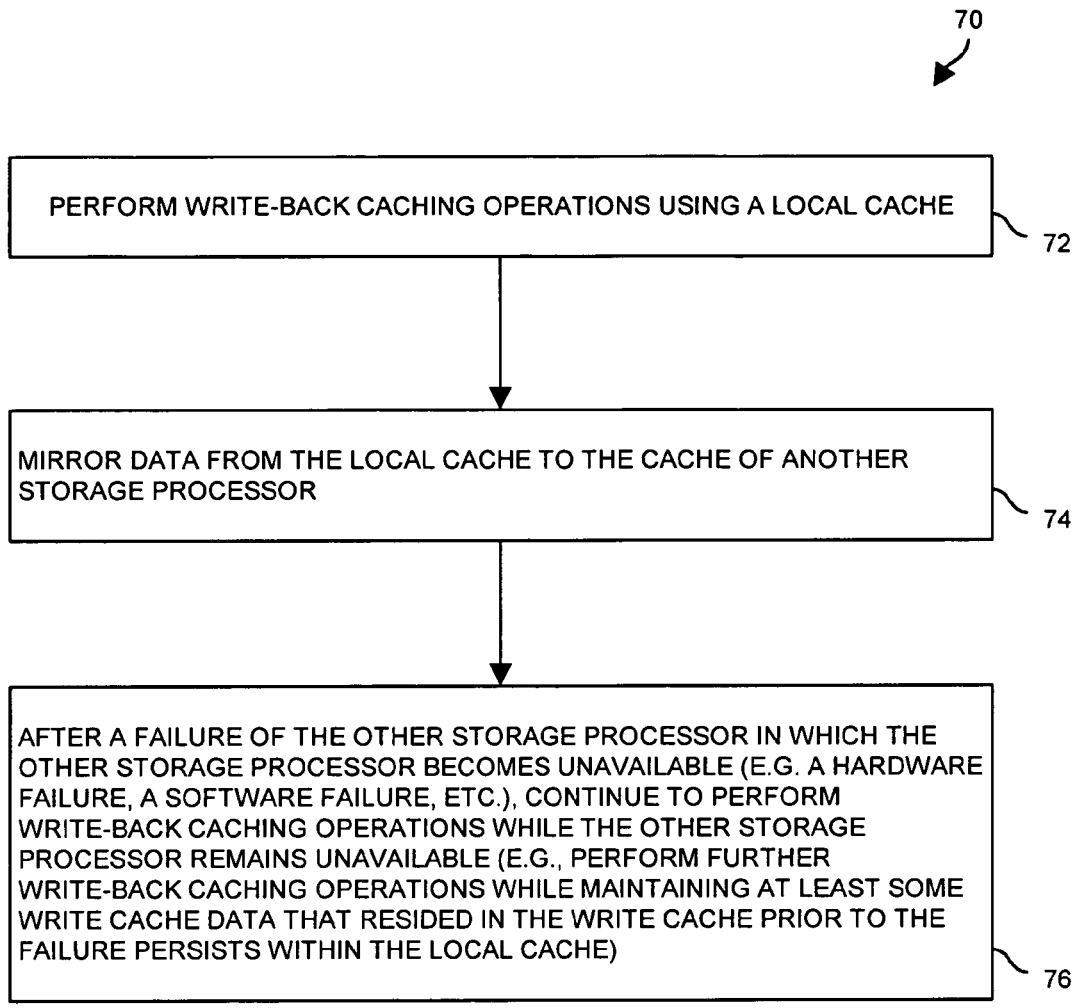
FIG. 3 is a flowchart of a procedure which is performed by a first storage processor in response to a failure of a second storage processor.

FIG. 3 is a flowchart of a procedure 70 illustrating how a first storage processor 26 (e.g., the storage processor 26(A)) responds to a failure of a second storage processor 26 (e.g., the storage processor 26(B)). Initially, the storage processors 26 attend to data storage operations on behalf of external hosts 22 (also see FIG. 1). Along these lines, in step 72, the controller 42 of each storage processor 26 of the data storage system 20 (FIG. 1) performs write-back caching operations using its local cache 56.

In step 74, the controller 42 of each storage processor 26 mirrors write data from its local cache 56 to the cache 56 of the other storage processor 26. In some arrangements, the controller 42 does not notify the external hosts 22 that the write operations are completed until the write data is stored in both caches 56 for fault tolerance.

In step 76, one of the storage processors 26 (e.g., the storage processor 26(B)) encounters a failure (e.g., a hardware failure that causes the failed storage processor 26 to become unavailable for an extended period of time, a software error that causes the failed storage processor 26 to briefly become unavailable while performing a soft reset, etc.). After the storage processor 26 fails, the remaining storage processor 26 (e.g., the storage processor 26(A)) continues to perform write-back caching operations using its local cache 56 while the other storage processor remains unavailable. In particular, the control circuitry 54 (FIG. 2) maintains write data within the local cache of the remaining storage processor 26 thus enabling the remaining storage processor 26 to continue performing write-back caching operations.

It should be understood that such continued write-back operation alleviates the need to vault the write cache of the remaining storage processor 26 to magnetic disk memory. Furthermore, the external hosts 22 can continue to enjoy relatively fast response times associated with a write-back write policy from the data storage system 20. Further details will now be provided with reference to FIG. 4.

Figure 4:
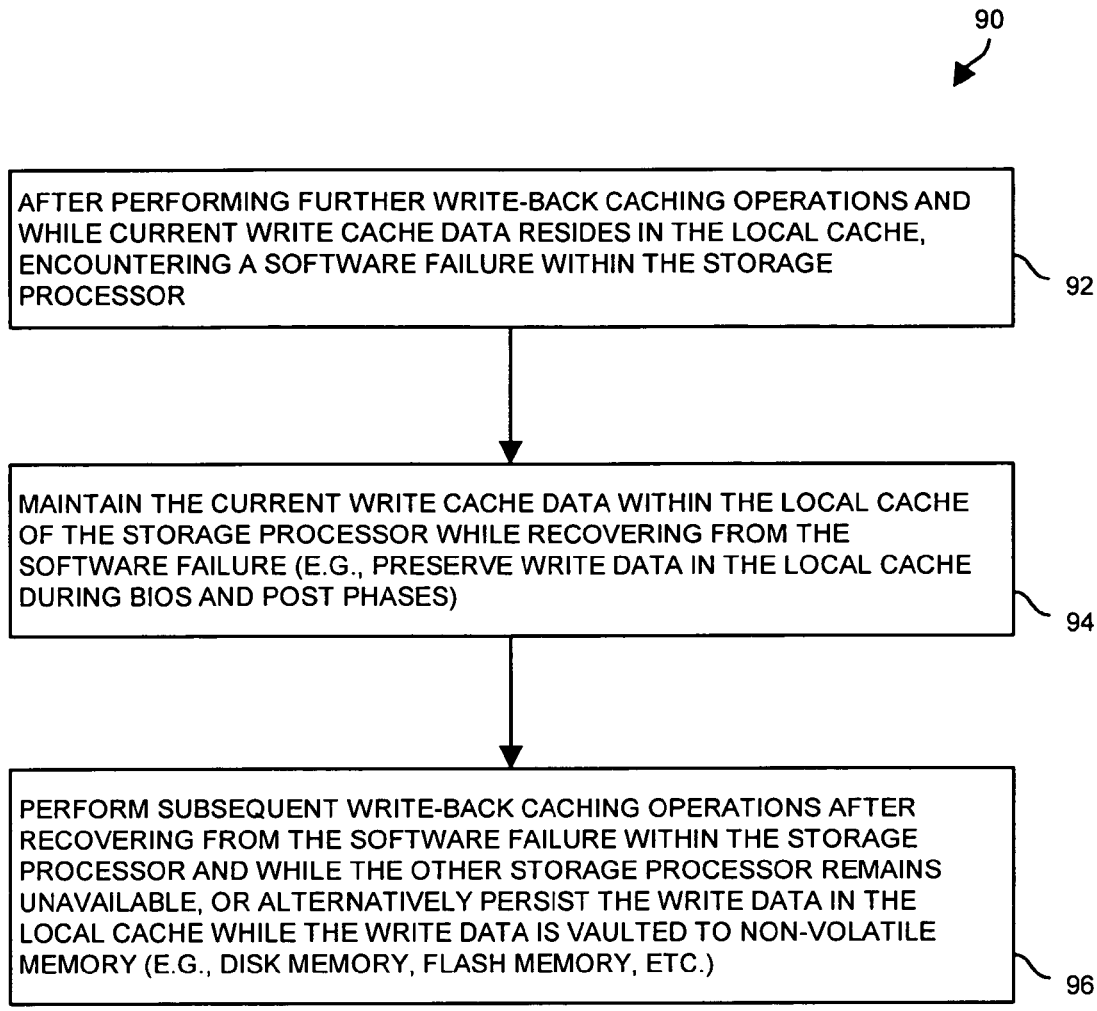
FIG. 4 is a flowchart of a procedure which is performed by the first storage processor in response to a failure of the first storage processor.

FIG. 4 is a flowchart of a procedure 90 illustrating how the remaining storage processor 26 (e.g., the storage processor 26(A)) responds to a failure of that storage processor 26. In step 92, after the remaining storage processor 26 has performed further write-back caching operations and while current write cache data resides in the local cache 56 of the remaining storage processor 26, the controller 42 of the remaining storage processor 26 encounters a software failure. For example, the remaining storage processor 26 may soft reset due to a crash of the operating system.

In step 94, the controller 42 maintains the current write cache data within the local write cache 56 while attempting to recover from the software failure. In particular, the controller 42 does not allow the local write cache 56 to be overwritten by either the BIOS or POST as the remaining storage processor 26 recovers from the failure. That is, the BIOS and POST, which traditionally write to local write cache, are prevented from corrupting the contents of the local write cache 56. As a result, the write data within the local write cache 56 is preserved.

In step 96, the controller 42 performing subsequent write-back caching operations after recovering from the software failure and while the other storage processor (e.g., the storage processor 26(B)) remains unavailable. Accordingly, the remaining storage processor 26 can continue to service data storage operations of the external hosts 22.

Optionally, if the controller 42 of the remaining storage processor 26 is incapable of returning to operation, other alternatives are available. In some arrangements, the control circuitry 54 of the memory subsystem 44 is configured to dump the contents of the local write cache 56 of the remaining storage processor 26 to a magnetic disk drive (e.g., see the set of disk drives 30 in FIG. 1). In other arrangements, the control circuitry 54 of the memory subsystem 44 is configured to dump the contents of the local write cache 56 of the remaining storage processor 26 to non-volatile flash memory (e.g., see the additional memory 58 in FIG. 2). In these situations, the data storage system 20 was able to continue operation through one storage processor failure (e.g., the storage processor 26(B)), and then temporarily persist the contents of the local write cache 56 until the contents are dumped to non-volatile memory in response to a second storage processor failure (e.g., the storage processor 26(A)).

As mentioned above, an enhanced technique for responding to a storage processor failure involves continuing to perform write-back caching operations while a failed storage processor 26 (e.g., the storage processor 26(B)) remains unavailable. Such a technique alleviates the need for the remaining storage processor 26 (e.g., the storage processor 26(A)) to vault cached write data to a magnetic disk and then flush the vaulted write data in response to the failed storage processor 26 as in conventional vaulting schemes which require that the data storage system remain unavailable during the vaulting process and which prevent the failed storage processor from returning during the vault flushing process. Furthermore, such a technique provides better response time on new host write operations than write-through caching which is performed following a failure in the conventional vaulting schemes.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for responding to a storage processor failure, the method comprising:
    performing write-back caching operations using a cache of a first storage processor;
    mirroring data from the cache of the first storage processor to a cache of a second storage processor; and
    after a failure of the second storage processor in which the second storage processor becomes unavailable, continuing to perform write-back caching operations using the cache of the first storage processor while the second storage processor remains unavailable;
    wherein current write cache data resides in the cache of the first storage processor after failure of the second storage processor; and wherein the method further comprises:
        temporarily persisting the current write cache data within the cache of the first storage processor while the first storage processor encounters a software failure and while the second storage processor remains unavailable, and
        dumping the current write cache data from the cache of the first storage processor to a set of disk drives while the current write cache data temporarily persists within the cache of the first storage processor.

2. A method for responding to a storage processor failure, the method comprising:
   performing write-back caching operations using a cache of a first storage processor;
   mirroring data from the cache of the first storage processor to a cache of a second storage processor; and
   after a failure of the second storage processor in which the second storage processor becomes unavailable, continuing to perform write-back caching operations using the cache of the first storage processor while the second storage processor remains unavailable;
   wherein current write cache data resides in the cache of the first storage processor after failure of the second storage processor; and wherein the method further comprises:
      temporarily persisting the current write cache data within the cache of the first storage processor while the first storage processor encounters a software failure and while the second storage processor remains unavailable, and
      dumping the current write cache data from the cache of the first storage processor to non-volatile flash memory while the current write cache data temporarily persists within the cache of the first storage processor.

3. A storage processor, comprising:
   a communications interface configured to communicate with a host computer and a set of disk drives;
   a local cache; and
   a controller coupled to the communications interface and the local cache, the controller being configured to respond to write instructions from the host computer through the communications interface by (i) performing write-back caching operations using the local cache, (ii) mirroring data from the local cache to a cache of another storage processor, and (iii) after a failure of the other storage processor in which the other storage processor becomes unavailable, continuing to perform write-back caching operations using the local cache while the other storage processor remains unavailable;
   wherein current write cache data resides in the local cache of the storage processor after failure of the other storage processor; and wherein the controller is further configured to:
      temporarily persist the current write cache data within the local cache of the storage processor while the storage processor encounters a software failure and while the other storage processor remains unavailable, and
      dump the current write cache data from the local cache of the storage processor to non-volatile memory while the current write cache data temporarily persists within the local cache of the storage processor.

4. The storage processor of claim 3 wherein the controller, when dumping the current write cache data from the local cache of the storage processor to non-volatile memory while the current write cache data temporarily persists within the local cache of the storage processor, is configured to dump the current write cache data from the local cache of the storage processor to non-volatile flash memory.

5. The storage processor of claim 3 wherein the controller, when dumping the current write cache data from the local cache of the storage processor to non-volatile memory while the current write cache data temporarily persists within the local cache of the storage processor, is configured to dump the current write cache data from the local cache of the storage processor to a set of disk drives.

6. The storage processor of claim 3 wherein the controller, when temporarily persisting the current write cache data within the local cache of the storage processor while the storage processor encounters a software failure and while the other storage processor remains unavailable, is configured to:
   preserve the current write cache data within the local cache of the storage processor while the storage processor runs Basic Input/Output System (BIOS) firmware in response to a soft reset operation performed by the storage processor.

7. The storage processor of claim 3 wherein the controller, when temporarily persisting the current write cache data within the local cache of the storage processor while the storage processor encounters a software failure and while the other storage processor remains unavailable, is further configured to:
   after execution of the BIOS firmware, preserve the current write cache data within the local cache of the storage processor while the storage processor runs Power-On Self Test code in response to the soft reset operation performed by the storage processor.

8. The method of claim 1 wherein temporarily persisting the current write cache data within the cache of the first storage processor while the first storage processor encounters a software failure and while the second storage processor remains unavailable includes:
   preserving the current write cache data within the cache of the first storage processor while the first storage processor runs Basic Input/Output System (BIOS) firmware in response to a soft reset operation performed by the first storage processor.

9. The method of claim 8 wherein temporarily persisting the current write cache data within the cache of the first storage processor while the first storage processor encounters a software failure and while the second storage processor remains unavailable further includes:
   after execution of the BIOS firmware, preserving the current write cache data within the cache of the first storage processor while the first storage processor runs Power-On Self Test code in response to the soft reset operation performed by the first storage processor.

10. The method of claim 2 wherein temporarily persisting the current write cache data within the cache of the first storage processor while the first storage processor encounters a software failure and while the second storage processor remains unavailable includes:
    preserving the current write cache data within the cache of the first storage processor while the first storage processor runs Basic Input/Output System (BIOS) firmware in response to a soft reset operation performed by the first storage processor.

11. The method of claim 10 wherein temporarily persisting the current write cache data within the cache of the first storage processor while the first storage processor encounters a software failure and while the second storage processor remains unavailable further includes:
    after execution of the BIOS firmware, preserving the current write cache data within the cache of the first storage processor while the first storage processor runs Power-On Self Test code in response to the soft reset operation performed by the first storage processor.

* * * * *